United States Patent [19]

Chiu

[11] Patent Number: 4,824,130
[45] Date of Patent: Apr. 25, 1989

[54] MINI FOLDABLE CYCLE

[76] Inventor: David Chiu, 252 Indian Head Rd., Kings Park, N.Y. 11754-4804

[21] Appl. No.: 109,660

[22] Filed: Oct. 19, 1987

[51] Int. Cl.$^4$ .......................... B62K 5/00; B62K 15/00
[52] U.S. Cl. .................................... 280/239; 280/287; 280/281.1
[58] Field of Search ......... 280/239, 278, 287, 281 LP, 280/281 R, 261

[56] References Cited

U.S. PATENT DOCUMENTS

| | | |
|---|---|---|
| 3,417,834 | 12/1968 | Smith . |
| 3,498,607 | 3/1970 | Eichholz ............................ 280/278 |
| 4,202,561 | 6/1978 | Yonkers ............................. 280/278 |
| 4,445,702 | 5/1984 | Reyes ................................. 280/239 |
| 4,460,191 | 7/1984 | Ishibashi ............................ 280/278 |
| 4,582,335 | 5/1985 | Paioli et al. ....................... 280/278 |
| 4,598,923 | 3/1983 | Csizmadia ......................... 280/287 |
| 4,634,138 | 1/1987 | Fryer ................................. 280/287 |
| 4,647,060 | 3/1987 | Tomkinson ..................... 280/281 R |
| 4,688,816 | 8/1987 | Yang ................................. 280/239 |

Primary Examiner—Charles A. Marmor
Assistant Examiner—Donn McGiehan
Attorney, Agent, or Firm—Leonard Belkin

[57] ABSTRACT

A mini foldable cycle having a single front wheel for steering and a pair of adjacent wheels in tandem located at the rear for propelling the vehicle. The tandem arranged rear wheels, with the front tandem wheel slightly higher than the rear tandem wheel, gives the cycle the feel and comfort of a large wheeled vehicle so that very small wheels are required. The cycle consequently is small and light, and is made foldable so that it can be reduced to a very small package for convenience of being transported.

17 Claims, 4 Drawing Sheets

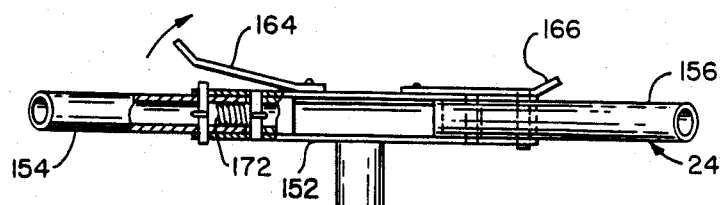
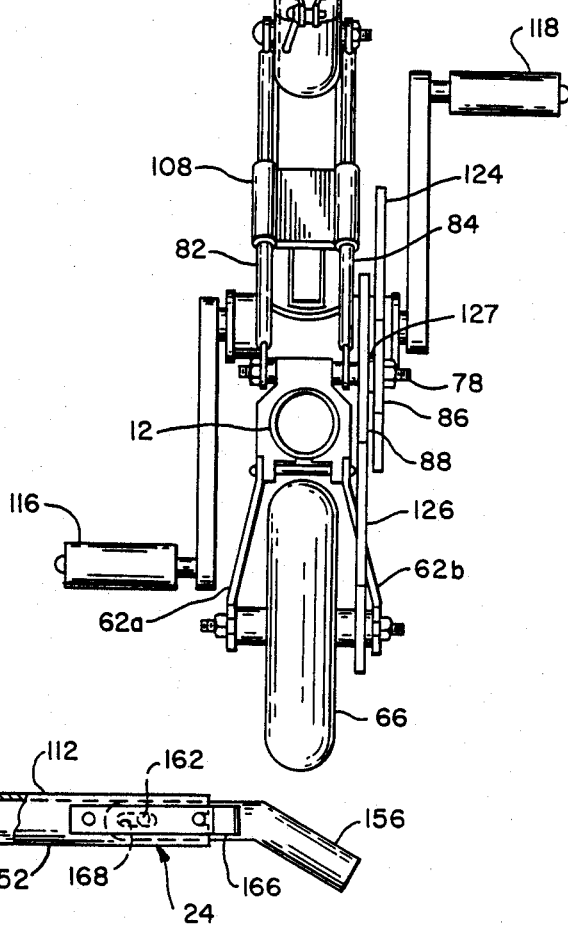
FIG. 2
FIG. 5

MINI FOLDABLE CYCLE

BACKGROUND OF THE INVENTION

This invention relates to a mini foldable cycle and more particularly to a cycle which is compact foldable into a small, readily portable unit and yet feels and behaves when being ridden like a full size bicycle.

Industry surveys show that the most comfortable bicycle for use on a typical pavement surface is one with 26" wheels. When a foldable bicycle is made with wheels of that size, the collapsed unit is too large and inconvenient to render it useful and marketable as a portable or transportable device.

As a result, the industry has compromised on foldable bicycles with 14" wheels. Such bikes lack the comfort and ease of use of the larger size unit, but they do provide a degree of portability not otherwise possible. Small wheels on a bicycle are not as effective in insulating the rider from road shock as large wheels are.

A variety of cycles which are foldable are shown in U.S. Pat. Nos. 3,417,834, 3,498,607, 4,202,561, 4,460,191, 4,582,335, and 4,598,923. In all of the designs shown in these patents, portability is obtained by reducing wheel size, but adequate provision for producing a bike which gives the advantages of the larger size wheel is lacking.

SUMMARY OF THE INVENTION

In the present invention, a foldable cycle utilizes three reduced sized wheels configured to provide the rideability of a bicycle with large wheels and the portability associated with the use of the smaller wheels.

In accordance with a preferred embodiment of this invention there is provided a foldable cycle comprising an elongated main frame tube having a front end and a rear end, a support on the front end of the main frame tube for supporting a front wheel, a support on the rear end of said main frame tube for two rear wheels in tandem, the front tandem wheel slightly higher than the rear tandem wheel, and a steering assembly supported on the front end of the main frame tube. The main frame tube also supports a passenger carrying seat and drive pedals for the cycle. A drive train interconnects the pedals and the rear wheels for driving the latter in unison. The raised wheel only makes contact with the pavement when the surface is rough.

In the embodiment of the invention just described, all of the wheels are much smaller in diameter than wheels currently in use, and the two wheels in tandem located at the rear of the main frame tube function together in such a manner as to give the feel and comfort of a single wheel of much larger diameter. The front tandem wheel is slightly higher than the rear tandem wheel so that the front tandem wheel only makes contact with rough pavement surface thereby helping to absorb the shock and making the ride more comfortable for the rider. In addition, to reduce the size of the cycle even further for convenience of carrying or transporting, the main frame tube may be constructed to telescope and the supports for the seat and pedals may be made foldable to reduce the size of the unit even further. An important additional advantage of the construction just described is the sharp reduction in the weight of the cycle.

It is therefore a principal object of this invention to produce a cycle of reduced size and weight which has many of the advantages of cycles of larger weight and size.

Other objects and advantages of this invention will hereinafter become obvious from the following detailed description of preferred embodiments of this invention.

BRIEF DESCRIPTION OF THE DRAWINGS

FIG. 2 is a rear view of the cycle shown in FIG. 1.

FIG. 5 is a view looking down on the handlebars of the cycle shown in FIG. 2.

DETAILED DESCRIPTION OF THE PREFERRED EMBODIMENTS

Figure 1:
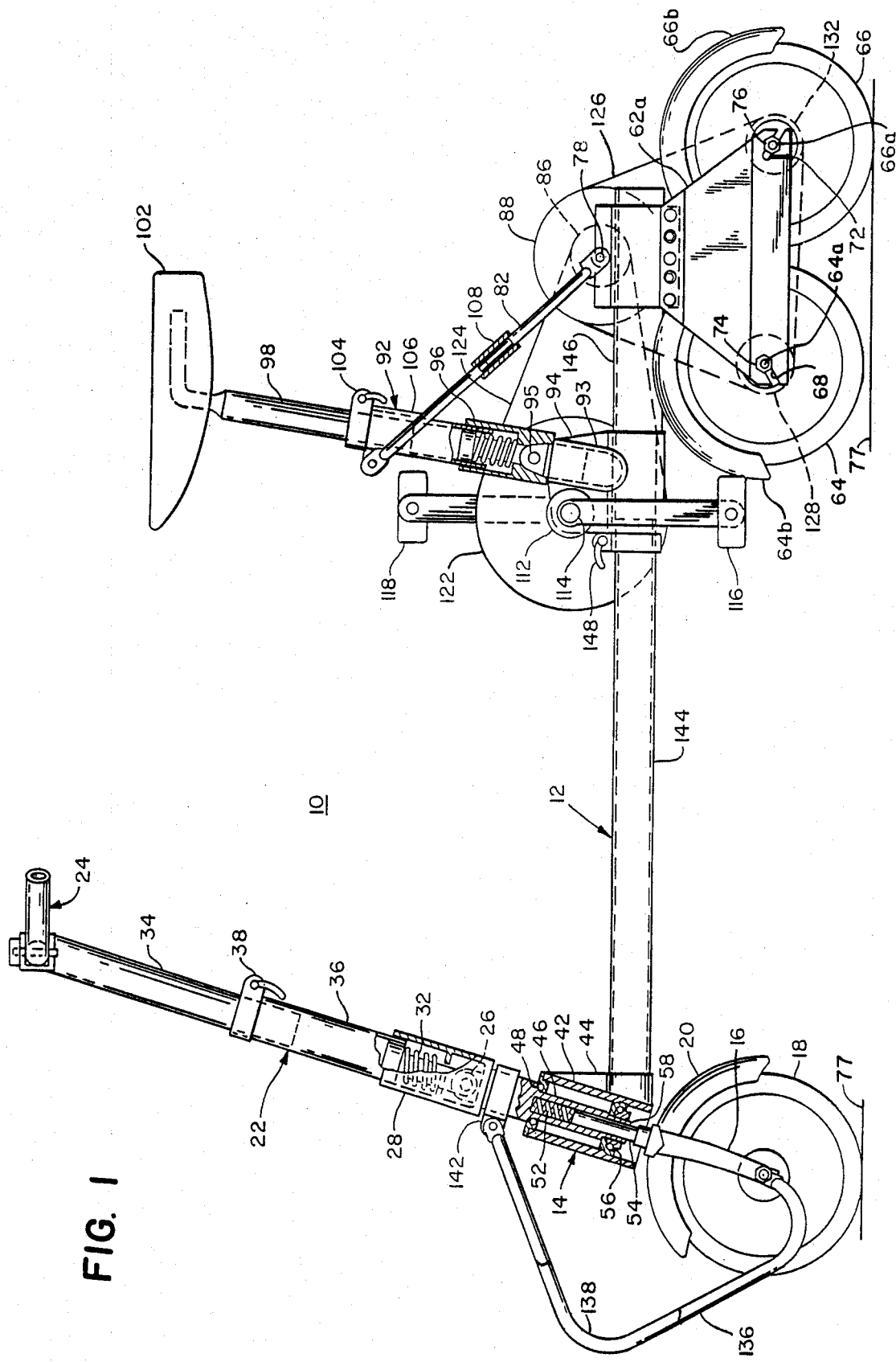
FIG. 1 is an elevation view of a cycle incorporating the principles of this invention.

Referring to FIG. 1, there is illustrated a cycle 10 embodying the principles of this invention comprising an elongated casing or tubular main frame tube 12 designed to be telescoped in a manner to be described below.

Figure 4:
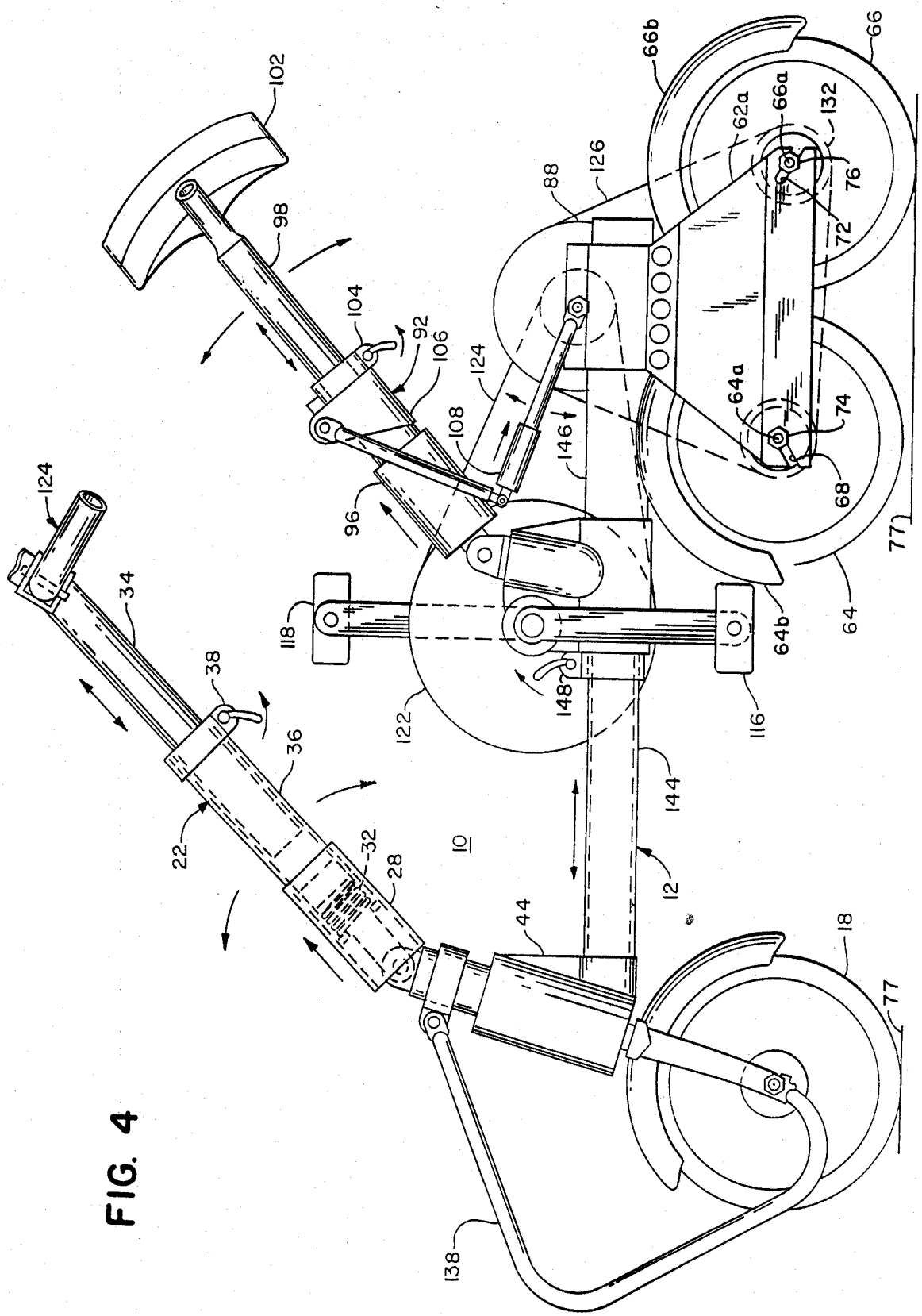
FIG. 4 is a similar view with the cycle partially folded.

At the front end of main frame tube 12 is mounted a brace assembly 14 from which underneath extends a pair of arms 16 to support front wheel 18 with splash guard 20, and from which above extends a tubular assembly 22 to carry handlebars 24 for steering cycle 10. Tubular assembly 22 is articulated about a shaft 26 and is enclosed by a cylinder 28 to prevent folding when cycle 10 is in use. To fold assembly 22 at shaft 26, cylinder 28 is raised (as seen in FIG. 4) to permit this to occur. A spring 32 within cylinder 28 biases the latter downwardly so that assembly 22 is incapable of folding inadvertently during normal operation of cycle 10. In addition, assembly 22 can be telescoped by virtue of a cylinder 34 which slides within cylinder 36 and a clamp 38 to tighten the two together at the height desired for handlebar 24, also to reduce the overall length of assembly 22 when cycle 10 is collapsed or folded for carrying or shipping.

Brace assembly 14 consists of a cylinder 42 supported at a slight angle by a bracket 44 attached to the front end of main frame tube 12. Cylinder 14 acts as the base for tubular assembly 22 which has a hollow shaft extension 46 entering cylinder 42 and supported by bearings 48 to permit rotation of assembly 22. A spring 52 within extension 46 acts as a shock absorber for shaft 54 attached to arms 16 and a bearing assembly 56 permits free rotation of wheel 18. Shaft extension 46 has a reduced diameter section 58 attached to the bottom portion of bearing assembly 56 and shaft 54 may be keyed or splined to section 58, so that assembly 22 and wheel 18 rotate in unison as part of a single assembly. The details of the steering assembly do not form a part of this invention.

To the rear end of main frame tube 12, as also seen in FIG. 2, is attached a pair of triangular plates 62a and 62b supporting two rear wheels 64 and 66 of equal diameter which are arranged adjacent to each other and in tandem as illustrated. Axles 64a and 66a for wheels 64 and 66, respectively, are mounted in slots 68 and 72, respectively, with nuts 74 and 76 to fix the location of axles 64a and 66a for the purpose to be described below. Wheels 64 and 66, as well as wheel 18, may be provided with spokes or solid hubs (not shown), and are referred to herein as the front and rear tandem wheels, respectively.

It will be noted that front tandem wheel 64 is slightly higher than rear tandem wheel 66 so that the former will not touch pavement when cycle 10 is positioned for use on pavement 77 and is driven on a smooth and flat surface. Slots 68 and 72 are disposed at suitable angles, such as 45 degrees from the horizontal as illustrated in order for the height of wheel 64 to be raised or lowered as desired.

Front tandem wheel 64 makes contact intermittently with pavement 77 depending on its roughness, thereby helping to absorb shocks caused by the roughness of the road and giving to the rider the feel and comfort of a cycle with larger wheels. In addition, the raised front tamdem wheel 64 does not interfere when turning corners or changing direction. The rider on cycle 10 would adjust the height of wheel 64 to match the requirements of the particular pavement, that is, to obtain the most comfortable ride. For a pavement of average roughness, wheel 64 would be about ½ inch above a smooth and flat pavement 77.

Plates 62a and 62b are attached by welding or other convenient means to main frame tube 12 while a shaft 78 passing through the assembly at the point of attachment supports a pair of struts 82 and 84, and pulley wheels or gears 86 and 88.

It will be noted that attached also to main frame tube 12 is an upwardly extending seat tube assembly 92 with a lower end member 93 attached by way of a bracket assembly 94 to tube 12 by welding or other convenient means. Assembly 92 is attached to lower end member 93 by way of a shaft 95 to permit folding in a manner to be described later and also includes a tube 96 into which slides a hollow shaft 98 on which is mounted a saddle 102 for carrying the driver of cycle 10 and a clamp 104 to lock the position of shaft 98. Saddle 102 may be rotatable up to 90 degrees.

Also attached to tube 96 is a clasp 106 which secures the upper ends of struts 82 and 84. It will be noted that both of the latter are provided with a sleeve 108 to enclose articulated joints to permit folding of struts 82 and 84 when sleeve 108 is moved out of the way. The latter is biased into the protective positions shown by springs (not shown) like that illustrated in connection with cylinder 28 previously described in connection with tube assembly 22.

Attached also to bracket assembly 94 is a tube 112 which encloses pedal shaft 114 on which is mounted both foot pedals 116 and 118, and drive pulley 122.

A chain or timing belt 124 interconnects pulleys 86 and 122 while a chain or timing belt 126 interconnects pulley 88 and a pair of gears or pulleys 128 and 132 mounted on axles 64a and 66a, respectively, of wheels 64 and 66. Should the height of wheel 64 be changed, a compensating change in the position of wheel 66 would be made to maintain proper tautness in belt 126. It should be noted that splash guards 64b and 66b, illustrated in FIG. 1, are not shown in FIG. 2, for clarity. Pulleys 86 and 88 are connected together by a cylinder 127 so that pulley 86 drives pulley 88. Hence, operation of foot pedals 116 and 118 causes the rotation of wheels 64 and 66 and thereby the propulsion of cycle 10. The use of slots 68 and 72 in plate 62a as well as similar slots in plate 62b is to permit adjustment of shafts 64a and 66a to obtain the desired tension on belt 126, especially when the height of wheel 64 is changed.

It is understood that the gear ratio of the system is determined by the diameters of the various pulleys which have been identified. It should also be understood, that while not shown, a multiple gear such as a three or even a ten speed gear transmission may be employed if desired.

Returning to the front of cycle 10 it will be seen that straddling front wheel 18 and attached to axle 134 are a pair of spring rails 136 and 138 the upper of ends of which are joined to a clasp 142 slidably mounted on tube assembly 22. Rails 136 and 138 act together as a front bumper to protect front wheel 18. In addition, rails 136 and 138 will raise the front of cycle 10 when an obstacle, such as a curb, sufficiently high to contact it is met. They also act as a suspension spring or stabilizer in conjunction with spring 52 and improve steerability of cycle 10 due to the additional connection to handlebars 24.

Main frame tube 12 consists of a male tube member 144 which slides in a female tube member 146 and a clamp 148 to tighten the two together. In FIG. 1, main frame tube 12 is fully extended, the position associated generally with cycle 10 in use.

As noted earlier, while preferential wheel size for those who ride bicycles is one which is about 26", portability is generally obtained by reducing the wheel size to about 14", with the result that there is a substantial sacrifice in comfort and ease of pedaling generally associated with the larger size. In the present invention, the preferred embodiment described above can typically be built with wheels which are about 7½ inches in diameter, and yet retain the feel, comfort and ease of pedaling which is associated with the bike having full size wheels.

Figure 3:
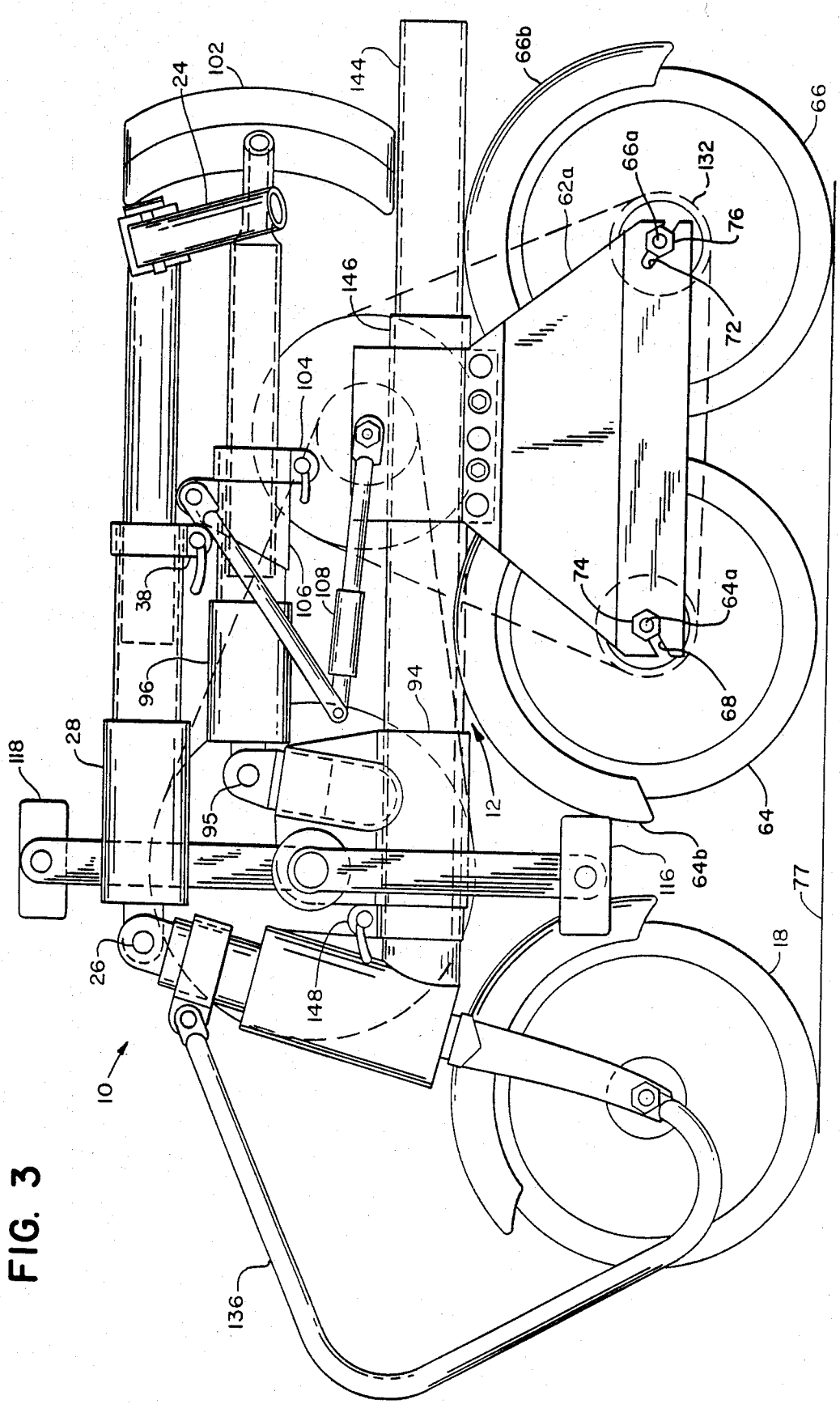
FIG. 3 is a side elevation view of the cycle of FIG. 1 in its folded state.

In order to render cycle 10 even more compact when collapsed as shown in FIG. 3, handle bars 24 may be made foldable. As seen if FIGS. 2 and 5, handle bars 24 may consist of a tube 152 in which a pair of handle bar arms 154 and 156 may be pivoted about shafts 158 and 162, respectively. A pair of spring members 164 and 166 must be lifted, as seen in FIG. 2, in order to permit arms 154 and 156 to be swung out of the way as shown in FIG. 5. Shafts 158 and 162 extend from spring members 164 and 166, respectively, passing through slot 168 in arm 156 and a slot (not shown) in arm 154. A spring 172 biases arm 154 in its open position so that a pin 174 will remain in slot 176. Arm 156 is provided with a similar biasing arrangement.

The embodiment of the invention as described above is also completely foldable or collapsible to permit easy carrying and shipping. As seen particularly in FIGS. 3 and 4, cycle 10 is collapsed by releasing latch 148 and telescoping main frame tube 12, raising sleeve 28 and folding tubular assembly 22 around shaft 26, raising sleeve 108, and folding struts 82 and 84. In addition, latch 38 may be released and handlebar 24 lowered, and latch 104 released and seat 102 lowered. Saddle 102 is shown rotated 90 degrees.

As seen in FIG. 3, cycle 10 is a very compact unit. With 7½ inch wheels, the weight of the unit is only inch wheels, the weight of the unit is only about 15 lbs. and the overall dimensions when folded is about 23×5×15 inches. Keeping in mind that this very small and light weight package when opened up turns into a cycle which is as comfortable and convenient to ride as a full size bicycle, it is seen that a remarkable expansion of bike riding could occur, with all of the energy savings and improvement in physical fitness which would occur as a result of more bike riding in this and other countries.

In the operation of mini cycle 10, where the pavement surface is flat and smooth, wheel 64 would not make contact with the surface, and cycle 10 will be about as comfortable to ride as a cycle with larger wheels.

Where the pavement has some roughness typical of the ordinary road surface, the smaller the wheels are the more uncomfortable ordinarily becomes such a cycle. However, in the present invention, the decreased comfort is compensated for by the front tandem wheel 64 coming into contact with roughened or raised portions of the paved surface and helping to redistribute the load and absorb some of the shock imposed on the rider by the pavement.

The height of front tandem wheel 64 as previously noted, would be adjusted to give maximum or the desired comfort to the driver for the particular pavement on which cycle 10 is being used. That is, wheel 64 would have its height adjusted to match the roughness of the payment on which the cycle is driven.

The two rear tandem wheels 64 and 66 have been described as being of equal diameter with the front wheel raised. The front tandem wheel could have a diameter slightly less than that of the rear wheel. In such a case, the diameter of pulley wheel 128 can be changed to compensate for this difference, while of course, the front tandem wheel can still be made adjustable as to height.

The cycle as herein described would not only appeal to professional people, executives, children, for recreational and vacation use, but also to those persons who will find that the mini foldable cycle of this invention can more conveniently be carried in boats, airplanes, and powered vehicles of all types.

While only one preferred embodiment of this invention has been described, it is understood that many variations of this invention are possible without departing from the principles of this invention as defined in the claims which follow.

What is claimed is:

1. A cycle for use in riding on a pavement comprising:
   a. elongated casing means having a front end and a rear end and means for supporting a passenger;
   b. means mounted on the front end of said casing means for supporting a front cycle wheel; and
   c. means mounted on the rear end of said casing means for supporting a pair of simultaneously driven wheels comprising one front and one rear wheel in tandem, including means to support said front wheel in tandem in a normal, raised position so as not to make contact with a smooth pavement during use of said cycle.

2. The cycle of claim 1 in which the wheels in tandem are aligned with said front cycle wheel, and the front wheel in tandem in a raised position is located so as to make intermittent contact with said pavement to compensate for roughness in said pavement.

3. The cycle of claim 2 in which the front wheel in tandem is adjustable as to its height above said pavement in order to permit compensation for roughness in the surface of said pavement.

4. The cycle of claim 3 having means to drive the two rear wheel in tandem.

5. The cycle of claim 4 in which said casing means comprises a telescopable tube assembly to permit collapsing of said cycle for transporting.

6. The cycle of claim 4 having steering means comprising a telescopable tube assembly and hinge means to permit collapsing and folding of said steering means to facilitate transportability of said cycle.

7. The cycle of claim 6 in which said passenger supporting means comprises a telescopable tubular assembly and hinge means.

8. The cycle of claim 7 having strut means interconnecting said means for supporting the two rear wheels in tandem and said passenger supporting means, said strut means including means for permitting folding of said strut means as said passenger supporting means folds.

9. The cycle of claim 8 in which each of said two wheels in tandem is provided with a wheel pulley, and said cycle includes means for transferring drive to both of the wheel pulleys in unison.

10. The cycle of claim 2 having means to adjust the relative height positions of the rear wheels in tandem to each other.

11. The cycle of claim 2 in which said tandem wheel supporting means includes means to adjust the vertical position of said front wheel in tandem with respect to the front wheel and the rear wheel in tandem to match the roughness of said pavement.

12. A mini cycle for use on a riding pavement comprising:
   a. an elongated tubular casing;
   b. means mounted on said casing for supporting a steerable wheel and means for steering said steerable wheel;
   c. means mounted on said casing for supporting two wheels in tandem with one of said tandem wheels in normal use being raised above the level of the steerable wheel and the other wheel in tandem so as not to make contact with a smooth pavement but sufficiently close to said pavement to make contact with a pavement with a rough surface;
   d. drive means mounted on said casing for providing drive in unison to said wheels in tandem;
   e. said drive means including a wheel pulley for each of said wheel in tandem, a pulley assembly having means for driving engagement with said wheel pulleys, and foot pedal means for delivering drive to said pulley assembly; and;
   f. means for supporting a passenger and said for pedal means on said casing.

13. The mini cycle of claim 12 in which said steerable wheel supporting means is collapsible and foldable.

14. The mini cycle of claim 12 having means mounted forward of said casing for raising said cycle when an obstacle is contacted.

15. The cycle of claim 12 including means to adjust the height of said raised wheel in tandem to compensate for roughness in said riding pavement.

16. A foldable cycle for use in riding on a pavement comprising:
   a. elongated, casing means comprising a telescopable tube assembly having a front end and a rear end, and means for supporting a passenger comprising a telescopable tubular assembly and first hinge means to permit folding of said passenger supporting means;
   b. means mounted on the front end of said casing means for supporting a front cycle wheel;

c. means mounted on the rear end of said casing means for supporting a pair of one front and one rear wheel in tandem aligned with said front cycle wheel, the bottom of the rear wheel in tandem when said cycle is deployed for use on a smooth and flat surface, said front wheel in tandem being provided with a wheel pulley, and said cycle including means for transferring drive to both of the wheel pulleys in unison;

d. strut means interconnecting said means for supporting the to wheels in tandem and said passenger supporting means, said strut means including means for permitting folding of said strut means as said passenger supporting means folds;

e. steering means comprising a telescopable tube assembly and second hinge means to permit collapsing and folding of said steering means to facilitate f. drive means including pedals to actuate said drive transferring means.

17. A mini foldable cycle for use in riding on a pavement comprising.

a. elongated casing means having a front end and a rear end and means for supporting a passenger;

b. means mounted on the front end of said casing means for supporting a front cycle wheel;

c. means mounted on the rear end of said casing means for supporting a pair of one front and one rear wheel in tandem aligned with said front cycle wheel, the bottom of the front wheel in tandem being higher than the bottom of the rear wheel in tandem when said cycle is deployed for use in order to make intermittent contact with said pavement to compensate for roughness in pavement.

d. said tandem wheel supporting means including means to adjust the vertical position of the front wheel in tandem with respect to the front cycle wheel and the rear wheel in tandem to obtain desired road comfort for conditions of the riding pavement.

* * * * *